United States Patent [19]

Rebhan

[11] Patent Number: 4,966,493

[45] Date of Patent: Oct. 30, 1990

[54] PROCESS AND APPARATUS FOR CLEANING CONTAMINATED SOIL

[75] Inventor: Dieter Rebhan, Geretsried-Gelting, Fed. Rep. of Germany

[73] Assignee: Linde Aktiengesellschaft, Wiesbaden, Fed. Rep. of Germany

[21] Appl. No.: 417,101

[22] Filed: Oct. 4, 1989

[30] Foreign Application Priority Data

Oct. 5, 1988 [DE] Fed. Rep. of Germany ....... 3833796

[51] Int. Cl.$^5$ .......................... B09B 1/00; E02D 19/14
[52] U.S. Cl. ...................................... 405/128; 62/260; 405/131; 405/129
[58] Field of Search ............... 405/130, 128, 129, 303; 62/260, 45.1; 210/170; 166/57

[56] References Cited

U.S. PATENT DOCUMENTS

| 620,112 | 2/1899 | Elliott | 405/130 X |
|---|---|---|---|
| 2,621,022 | 12/1952 | Bardill | 405/130 X |
| 3,183,675 | 5/1965 | Schroeder | 405/130 |
| 3,220,470 | 11/1965 | Balch | 405/130 X |
| 3,726,095 | 4/1973 | Ross | 405/130 |
| 4,525,282 | 6/1985 | Bartsch et al. | 210/170 X |

Primary Examiner—Dennis L. Taylor
Attorney, Agent, or Firm—Millen, White & Zelano

[57] ABSTRACT

A process and apparatus are provided for cleaning contaminated earth. The contaminated soil is first frozen using freezer boxes which are placed on the surface of the ground to be frozen. A refrigerant, preferably liquid nitrogen, is then introduced into the box until the soil is frozen to a desired depth and temperature. The frozen soil containing pollutants is then removed and placed in sealed containers for optional further treatment.

10 Claims, 1 Drawing Sheet

PROCESS AND APPARATUS FOR CLEANING CONTAMINATED SOIL

BACKGROUND OF THE INVENTION

The invention relates in general to a process for cleaning contaminated ground and, more particularly, to a process and apparatus for freezing and then removing soil contaminated with pollutants.

THE PRIOR ART

It is known that soil heavily contaminated with pollutants, such as on factory premises, garbage dumps, waste dumps, etc., represents a serious threat to the environment and to mankind. For example, it is known that pollutants often seep through the soil and contaminate ground waters, thus endangering the drinking water supply of large population centers. Cleaning dumps containing soil having high concentrations of toxic pollutants is particularly difficult and dangerous, even when only partial clean-up measures are undertaken. One known method of safely removing toxic and volatile pollutants is the so-called "icing" process, in which sections of contaminated soil are first frozen and then removed for further treatment. In this process, the pollutants are frozen in situ in the soil, thus preventing the escape of volatile pollutants into the atmosphere and surrounding soil. The frozen contaminated soil is removed and sealed in suitable containers.

In the icing process, the soil is frozen by means of a cold refrigerant introduced into the soil through freezer pipes. These pipes are often rammed into the ground, and a refrigerant, usually liquid nitrogen, is introduced into the freezer pipes. To avoid damage to the freezer pipes, bore holes are frequently made in the soil, and the freezer pipes are then inserted into the bore holes. However, this procedure has the potential for causing further pollution of the soil because in boring or ramming freezer pipes into the earth, the contaminated ground areas can mix, e.g., poison-containing barrels can be ruptured, resulting in the escape of volatile pollutants. Additionally, boring holes in soft, contaminated terrain is expensive and dangerous. To prevent the escape of volatile contaminants, low temperatures are desired in the ground precisely where the ground is to be removed. However, when using freezer pipes, the coldest ground area lies directly below the pipe, rather than over a larger area of earth to be removed. Further, freezer pipes damaged during the removal of earth are difficult and costly to repair and can be returned to operation only with difficulty. Moreover, an expensive installation is necessary to supply liquid nitrogen to the freezer pipes.

SUMMARY OF THE INVENTION

Therefore, it is an object of the invention to provide a process and apparatus for freezing contaminated soil to be removed in an economical and safe way, without the above-described drawbacks.

According to the present invention, a process and apparatus is provided to freeze the earth to be removed and cleaned. In a preferred aspect of the invention, at least one freezer box is placed on the ground to be cleaned. A refrigerant is introduced into the box until the earth under the freezer box is frozen to a desired temperature and depth.

Any conventional refrigerant can be used, e.g., $CO_2$, LNG, brine. Preferably, a liquid nitrogen refrigerant at a temperature of from about $-170$ to $-197°$ C. is introduced into the freezer box and warmed gaseous nitrogen is withdrawn from the freezer box. The rate of introduction of the refrigerant is preferably adjusted as a function of the temperature of the warmed gaseous nitrogen withdrawn or the rate of frost propagation in the ground to more accurately control the rate which the earth is cooled.

For example, where the earth is to be frozen to a depth of 3 m, nitrogen can be introduced at a temperature of from about $-170$ to $-197°$ C. When the temperature of the nitrogen vapor discharge from the freezer box rises above about $-100°$ C., additional liquid nitrogen is introduced into the freezer box. In operation, the freezer box can be hoisted above the contaminated ground simply by a hoisting device, e.g., a crane, and then lowered onto the ground to be cleaned.

In a preferred embodiment, a number of freezer boxes are placed on the ground adjacent one another so as to substantially cover the contaminated ground. The freezer boxes, which can be of the same or different size and/or geometry, can be placed on horizontal, as well as on slanted, terrain to achieve a good match with the topography of the contaminated ground area. The freezer boxes can be connected in series so that the same refrigerant flows through all of the boxes, or else each freezer box can be individually supplied with refrigerant.

Several measures are employed to avoid the escape of toxic and/or noxious vapors during excavation. First, a layer of the frozen ground is preferably left intact to provide a vapor barrier. Second, the earthen sidewalls of the excavation are also frozen shortly after the earth is removed. For example, if the contaminated soil is frozen up to a depth of, e.g., 3 m, the frozen soil is removed, e.g., with the aid of an excavator, to a depth of only about 2.50 m. In this way, the escape of vapors is avoided. To avoid the escape of vapors from the sidewalls of the ground exposed during excavation, freezer boxes can be placed on the exposed sidewalls and a refrigerant, preferably liquid nitrogen, is introduced until a layer of soil on the sidewall is frozen to a depth of from about 0.2 to 0.6 m to provide a vapor barrier.

In another preferred embodiment of the invention, the freezing and removal of the contaminated ground is performed stepwise. For this purpose, a freezer box is placed on a first ground area which is then frozen. The freezer box is then moved laterally to a second ground area adjacent the first ground area. The first ground area is removed while the second ground area is being frozen. This procedure can be repeated and used to clear large areas of contaminated soil.

The present process is achieved by means of a freezer means for freezing the soil and an excavation means for removing the frozen earth. According to a preferred aspect of the invention, the freezer means comprises at least one freezer box having a feed line or port for the introduction of cold refrigerant and a discharge line or port for exiting warmed refrigerant.

In a preferred embodiment, when fairly level terrain is involved, the freezer box can be square or rectangular and have a width of from about 0.5–3 m, a length of from about 1–5 m, and height of from about 0.05–0.5 m. Other freezer box sizes and shapes can be used to match irregular terrain.

The freezer box preferably has an attachment means (not shown) such as an eye or hook to which a hoisting device can be connected. In this way, the freezer box can be positioned on the ground, e.g., with the aid of a crane, and/or easily moved from place to place with the crane.

In another preferred embodiment, the top surface of the freezer box is provided with a layer of insulation to minimize heat transfer from the atmosphere. A foam insulation layer applied to the top surface of the freezer box preferably comprises e.g. PU-foam or PVDC-foam or vacuum insulation.

In another embodiment, an evacuated chamber can be placed above the top surface of the freezer box to minimize heat transfer from the atmosphere.

When the present process is used on inclined terrain, it is preferred to use a freezer box having a plurality of internal baffles. These baffles are preferably configured to form a loop-shaped flow path for the refrigerant through the freezer box. In this way, all of the ground covered by the freezer box is more uniformly cooled.

The bottom of the freezer box is preferably formed of a material having high heat conductivity, e.g., aluminum, so that contaminated soil in contact with the bottom can be quickly frozen without substantial heat transfer from the atmosphere. In another embodiment, the freezer box is open at the bottom so that refrigerant introduced into the box comes into direct contact with the contaminated soil. In this embodiment, the box is positioned with all of its sides in sealing contact with the ground. Although the freezer box can be made of any heat conductive metal, it is preferably constructed of sheet aluminum, thereby providing a lightweight, simple freezer unit with high heat conductivity. In another embodiment, the freezer box can be constructed of flexible elastic materials, which can conform to the contour of irregular terrain. Preferred flexible elastic materials from which the freezer box can be constructed include e.g. silicone rubber, PTFE-foil, compounded foil, metal foil.

In still another embodiment, the freezer box can be constructed of metal foil which is also sufficiently thin and flexible to conform to the terrain.

Since only a few connections for the refrigerant are needed, the apparatus of the present invention assures safer worker conditions during clean-up of contaminated soil. Additionally, removal of the ground always occurs at the coldest areas. Further, the drawbacks associated with boring into the earth are avoided, and the large heat exchange interface between contaminated soil and the metal freezer box provides a very high rate of frost propagation. Due to the simplicity of the process, a rapid and uncomplicated assembly of the apparatus on the terrain to be cleaned provides for economy of operation.

BRIEF DESCRIPTION OF THE DRAWINGS

Various other objects, features, and attendant advantages of the present invention will be more fully appreciated as the same becomes better understood when considered in conjunction with the accompanying drawings, in which like reference characters designate the same or similar parts throughout the several views and wherein.

DETAILED DESCRIPTION OF THE PREFERRED EMBODIMENTS

Figure 1:
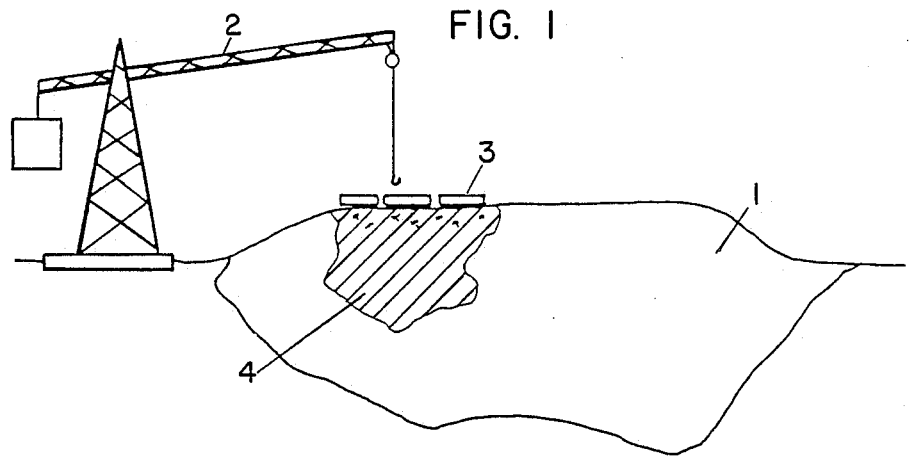
FIG. 1 is a partial sectional view of the apparatus of the present invention used for cleaning soil.

FIG. 1 illustrates one aspect of the present invention in which a dump 1 is being cleaned. With the aid of crane 2, freezer boxes 3 are placed on the surface of a contaminated section of ground 4. Liquid nitrogen is then introduced into freezer boxes 3 until the ground beneath them is frozen to a desired temperature and depth. When a sufficiently large section of earth 5 is frozen, a freezer box 3 is removed laterally to another site so that frozen earth 5 can be removed with an excavator. The excavation can be carried out by any of the well-known methods and apparatus in the art. When removed, the contaminated material is tightly sealed in containers while still in a frozen condition. This frozen material can then be optionally treated to decontaminate and/or clean the soil. As frozen soil 4 is removed, the exposed earthen sidewalls of the excavation are treated to prevent the escape of toxic or noxious materials from the sidewalls. This is accomplished by placing boxes 3 against the sidewalls and then freezing the sidewalls to a desired depth. Optionally, the insulated boxes used to freeze the sidewalls can be thin, with the only uninsulated surface of the box being in contact with an earthen sidewall. The pit thus formed by excavation can, for example, be filled with uncontaminated soil or rock.

Figure 2:
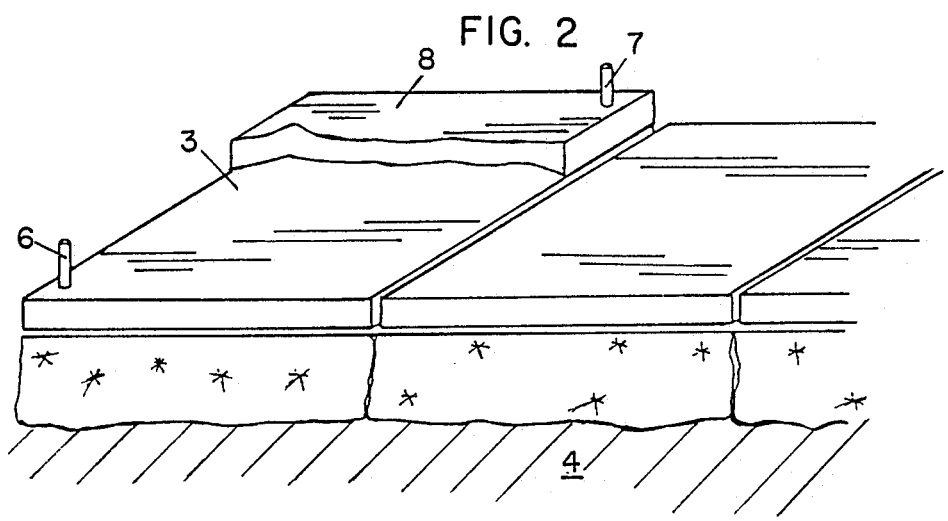
FIG. 2 is a perspective view in partial section of apparatus used for freezing a section of contaminated soil.

FIG. 2 illustrates in partial section the freezer box 3 shown in FIG. 1, with a frozen chunk of earth below it. The freezer box 3 is shown with a feed line 6 for entering liquid nitrogen and an exhaust line 7 for discharging gaseous nitrogen. Freezer box 3 is shown with an optional foam layer 8 of thermal insulation. The typical freezer box 3 has a height of about 0.05 m, a width of about 0.5 m, and a length of about 1 m. During operation, the liquid nitrogen feed is adjusted as a function of the temperature of the gaseous nitrogen discharging from exhaust gas line 7. After about 250 hours, the frozen chunk of earth 5 below freezer box 3 has a surface temperature of about $-190°$ C. and a temperature of about $0°$ C. at a depth of about 3 m.

Figure 3:
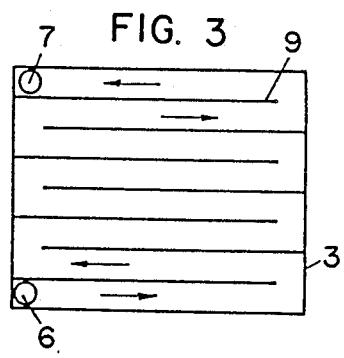
FIG. 3 is a top view of the interior of a freezer box equipped with baffles.

FIG. 3 is a top interior view of a preferred freezer box having baffles 9 therein. The baffles 9 are arranged in freezer box 3 so as to form a loop-shaped flow path for the nitrogen or other refrigerant flowing from entrance line 6 to exhaust line 7.

Figure 4:
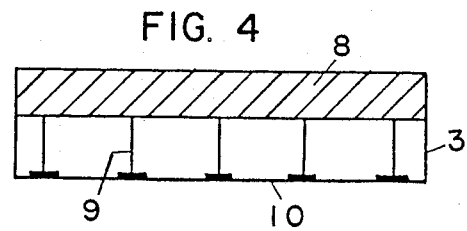
FIG. 4 is a sectional view of a freezer box equipped with baffles and an insulated top surface.

FIG. 4 is a cross-sectional view through freezer box 3 illustrating the construction of baffles 9 which are formed from aluminum T-sections. The freezer box 3 is covered by a foam layer 8 of thermal insulation. The freezer box 3 is shown with a bottom 10 constructed of sheet aluminum to facilitate rapid heat transfer between the box to be frozen and the liquid nitrogen in the freezer box 3.

Without further elaboration, it is believed that one skilled in the art can, using the preceding description, utilize the present invention to its fullest extent. The above specific embodiments are, therefore, to be construed as merely illustrative and not limitative of the disclosure in any way whatsoever.

The entire texts of all applications, patents, and publications, if any, cited above and below, and of corresponding West German Application No. P 38 33 796.7, filed Oct. 5, 1988, are hereby incorporated by reference.

What is claimed is:

1. A process for cleaning earth contaminated with toxic pollutants which may be in buried containers, the process comprising placing at least one freezer box on the surface only of the contaminated earth to be cleaned so as to avoid disturbing and/or releasing any buried pollutants into the surrounding earth or groundwater, introducing a cold refrigerant into the freezer box until the earth below the freezer box is frozen to a desired depth, and removing at least a portion of the frozen contaminated earth, and avoiding disturbing unfrozen contaminated earth which could release toxic pollutants into surrounding soil and the atmosphere.

2. The process of claim 1, wherein the cold refrigerant is liquid nitrogen refrigerant which is introduced into at least one freezer box, and gaseous nitrogen is discharged therefrom.

3. The process of claim 2, wherein the rate of introduction of the liquid nitrogen into the freezer box is adjusted as a function of the temperature of the gaseous nitrogen withdrawn.

4. The process of claim 1, further comprising placing a plurality of freezer boxes, optionally of various sizes, next to one another on the earth to be cleaned so that the contaminated earth is substantially covered with freezer boxes.

5. The process of claim 1, further comprising placing freezer boxes against exposed earthen sidewalls resulting from the removal of contaminated earth, and introducing cold refrigerant into the freezer boxes to freeze the earthen sidewalls, thereby to prevent the release of pollutants into the atmosphere and surrounding soil.

6. The process of claim 1, wherein the freezer box is maintained in contact with the surface of the earth until the earth is frozen up to a depth of about 3 m.

7. The process of claim 1, wherein a hoist is used to place the freezer box on the earth.

8. The process of claim 1, wherein freezing and removal of contaminated earth is performed in a series of steps in which a first earthen area is frozen, the freezer box used to freeze the first earthen area is then moved to a second earthen area which is frozen while at least a portion of the frozen first earthen area is removed to a desired depth.

9. The process of claim 1, wherein in the removal of frozen earth, a lower frozen layer thereof having a thickness sufficient to provide a vapor barrier is left intact and undisturbed, thereby to avoid the escape of toxic and/or noxious vapors into the atmosphere during excavation of contaminated earth.

10. The process of claim 1, wherein after excavation of frozen earth, the resultant earthen sidewalls of the excavation are frozen, thereby to avoid the escape from the sidewalls of toxic and/or noxious vapors into the atmosphere during excavation.

* * * * *